Dec. 7, 1965
W. D. MYERS
3,221,820
SUBSURFACE ACTUATING DEVICE AND FORMATION
TESTER VALVE APPARATUS
Filed Aug. 28, 1962
5 Sheets-Sheet 2
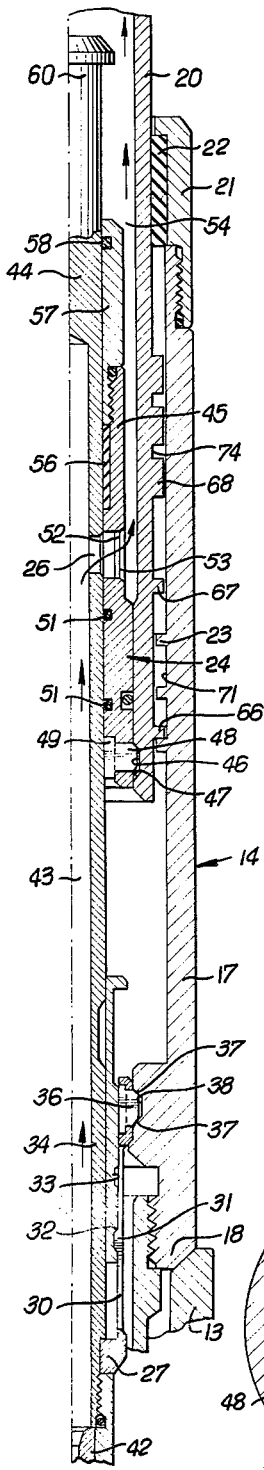
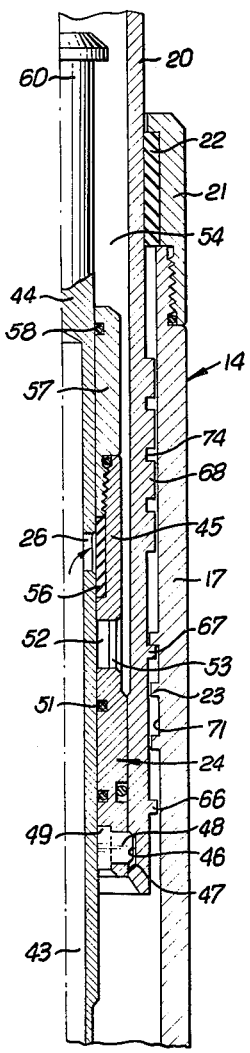
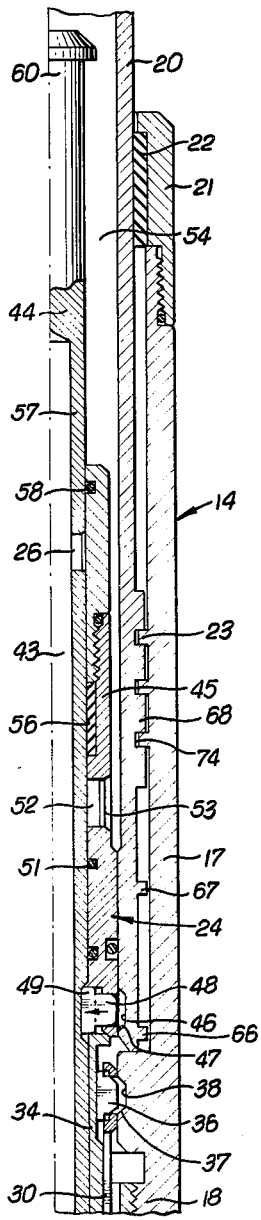
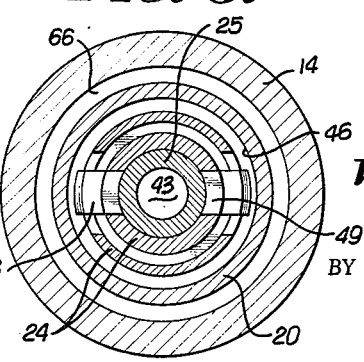
WILLIAM D. MYERS
INVENTOR.
BY Mellin and Hanscom
ATTORNEYS.

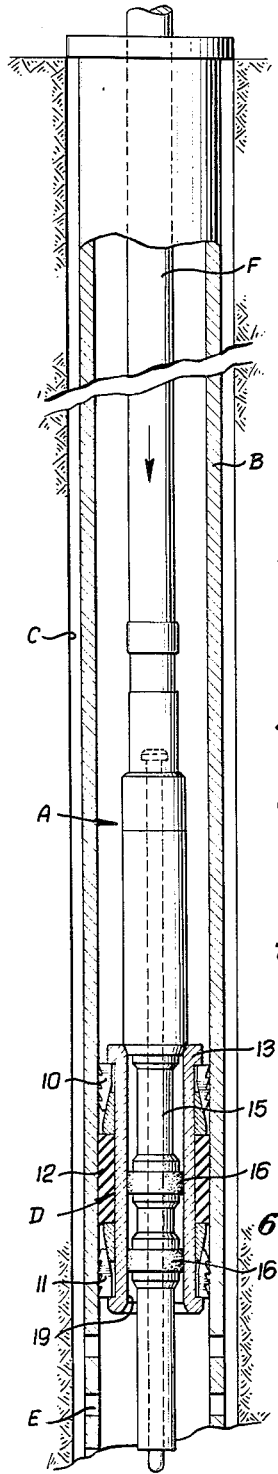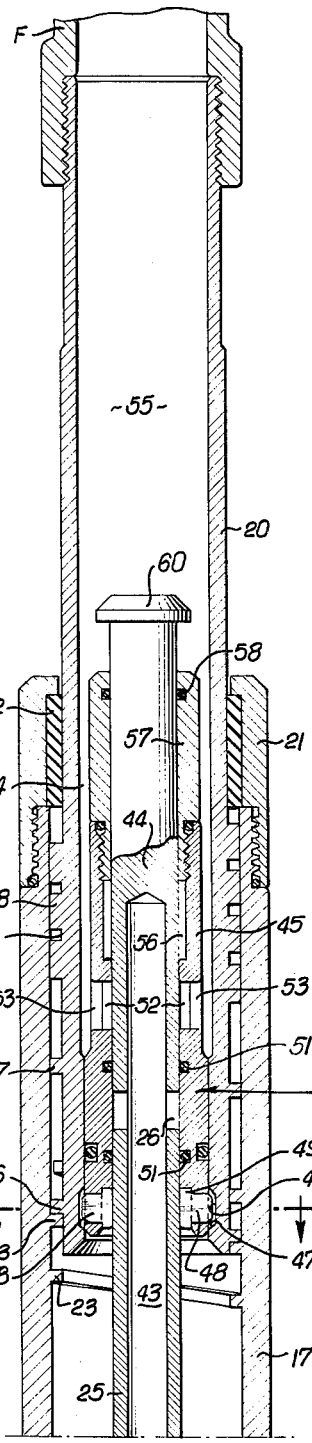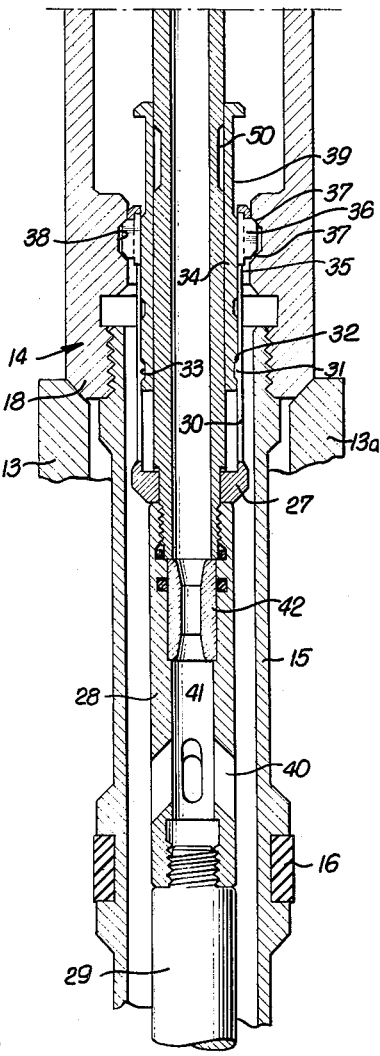
WILLIAM D. MYERS
INVENTOR.

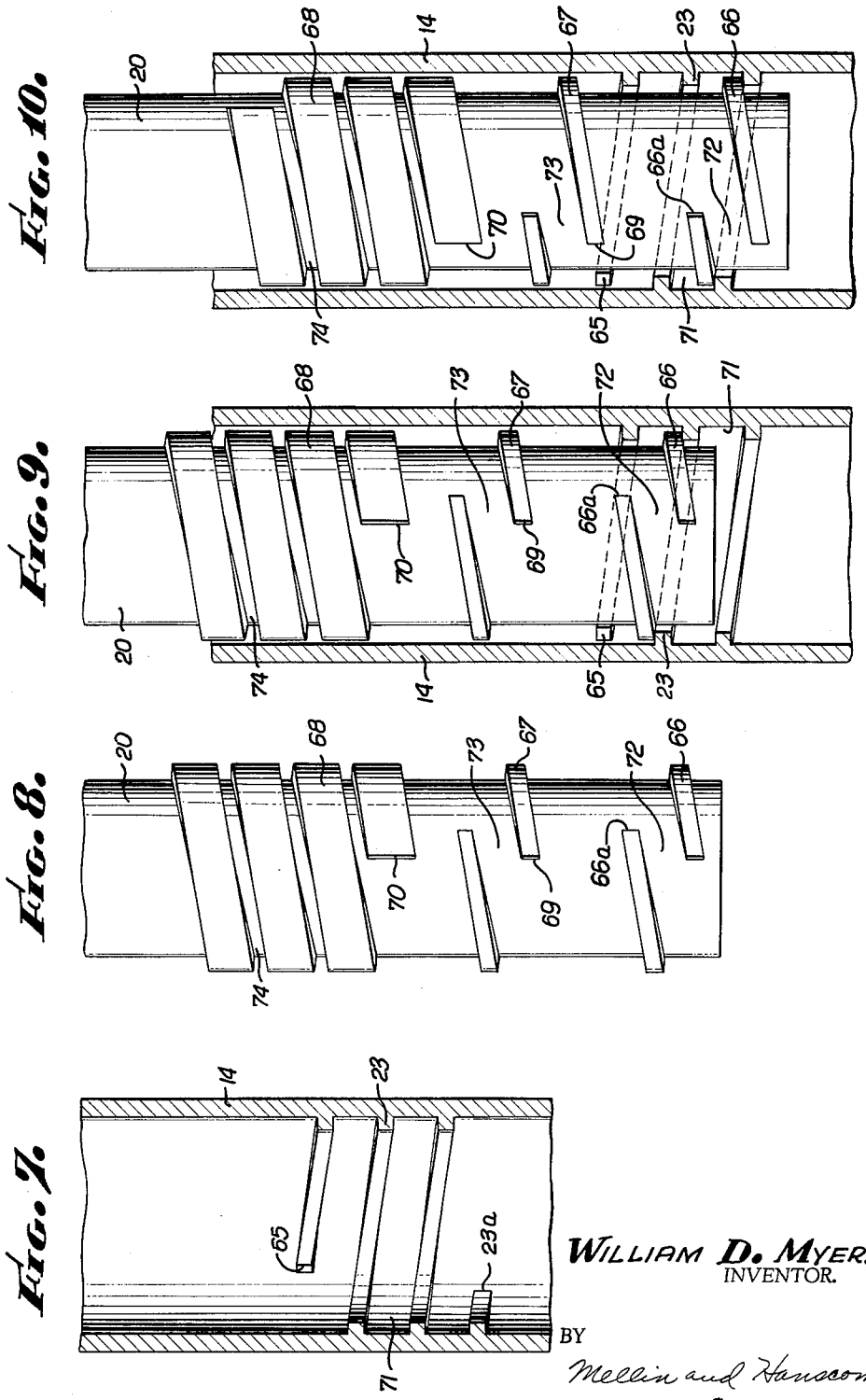

WILLIAM D. MYERS
INVENTOR.

BY
Mellin and Hanscom
ATTORNEYS.

INVENTOR.
WILLIAM D. MYERS
BY
Meelin and Hanscom
ATTORNEYS.

3,221,820
SUBSURFACE ACTUATING DEVICE AND FORMATION TESTER VALVE APPARATUS
William D. Myers, Houston, Tex., assignor to Baker Oil Tools, Inc., Los Angeles, Calif., a corporation of California
Filed Aug. 28, 1962, Ser. No. 219,835
16 Claims. (Cl. 166—237)

The present invention relates to subsurface well bore apparatus, and more particularly to apparatus controlled from the top of the well bore by manipulation of the tubular string to which the apparatus is secured.

An object of the invention is to provide a subsurface apparatus connectible to a tubular string extending to the top of a well bore and in which parts of the apparatus can be shifted accurately to different relative positions in response to rotation of the tubular string in the same direction, as in a right-hand direction only.

Another object of the invention is to provide a subsurface apparatus connectible to a tubular string extending to the top of a well bore, and in which parts of the apparatus can be shifted longitudinally with respect to one another to different relative positions with a high degree of control and accuracy in response to rotation of a tubular string in the same single direction, as in a right-hand direction.

A further object of the invention is to provide subsurface valve apparatus for testing a formation adapted to be shifted between closed and open conditions in response to manipulation of a tubular string, in which the tubular string is effective to release the valve apparatus and permit its withdrawal through the tubular string to the top of the well bore.

An additional object of the invention is to provide subsurface valve apparatus for testing a formation, the parts of which can be shifted accurately between valve closing and valve opening positions in response to rotation of the tubular string in the same single direction.

This invention possesses many other advantages, and has other objects which may be made more clearly apparent from a consideration of a form in which it may be embodied. This form is shown in the drawings accompanying and forming part of the present specification. It will now be described in detail, for the purpose of illustrating the general principles of the invention; but it is to be understood that such detailed description is not to be taken in a limiting sense, since the scope of the invention is best defined by the appended claims.

Referring to the drawings:

FIGURE 1 is a side elevational view of an apparatus embodying the invention disposed in a well casing located in a well bore;

FIGS. 2a and 2b together constitute a longitudinal section through the apparatus, with its valve in its initial closed position, FIG. 2b constituting a lower continuation of FIG. 2a;

FIG. 3 is a quarter longitudinal section of the apparatus disclosed in FIGS. 2a and 2b, with the valve apparatus shifted to an open position;

FIG. 4 is a view similar to FIG. 3 disclosing the apparatus with its valve reclosed;

FIG. 5 is a view similar to FIG. 4 showing the internal portion of the apparatus in a released condition for withdrawal through a tubular string connected to the apparatus;

FIG. 6 is a cross-section taken along the line 6—6 on FIG. 2a;

FIG. 7 is a view of the external portion of the operating mechanism forming part of the apparatus;

FIG. 8 is a side elevational view of the inner tubular actuator member forming part of the apparatus;

Figure 17:
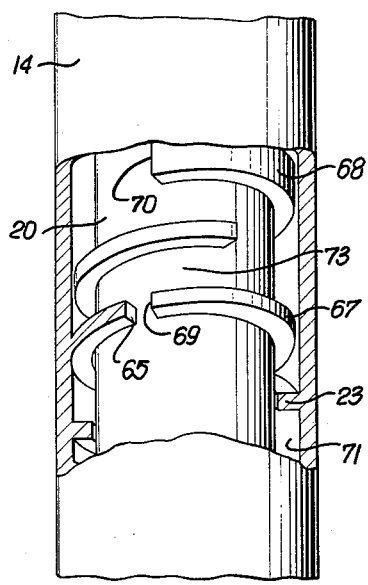
Figure 18:
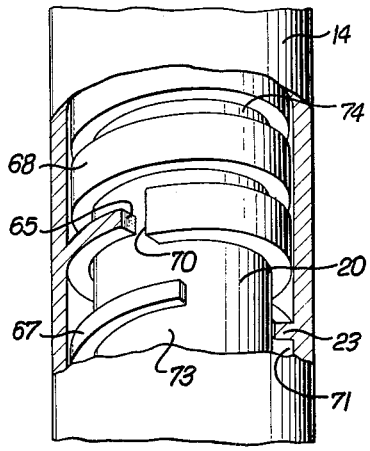

FIGS. 9 to 16, inclusive, are longitudinal sections through the outer portion of the apparatus, and side elevational views of the inner actuator portion of the apparatus, showing such parts in different relative positions that they occupy in controlling the valve mechanism illustrated in FIGS. 2a to 6;

FIG. 17 is an isometric view, with a portion broken away, of a portion of the valve actuating mechanism with the parts in one relative position;

FIG. 18 is a view similar to FIG. 17 showing the valve actuating mechanism with its parts in another relative position.

The specific apparatus A illustrated in the drawings is a valve mechanism for testing a formation. It is adapted to be lowered through casing B disposed in a well bore C and placed in association with a well packer D that may have been previously installed in the well bore above casing perforations E through which the production from a well formation can flow. The well packer D is of any suitable type, having upper and lower slips 10, 11 and an intervening packing structure 12 for anchoring the tubular body 13 of the packer in sealed-off relation against the well casing B.

As disclosed, the formation testing valve apparatus A includes a housing or body 14 comprising a tubular extension 15 disposed within the body 13 of the well packer and having suitable seals 16 thereon for sealing against the wall of the packer body. The tubular extension 15 is threadedly secured to the upper portion 17 of the housing or body 14, the lower head 18 of which engages the upper portion 13a of the packer body to locate the seals 16 in the body passage 19 and to support the housing or body 14 against movement downwardly of the packer body 13. The upper housing portion 17 telescopically receives an inner tubular actuator 20, the upper end of which is threadedly attached to the lower end of a tubular string F, such as a string of tubing, extending to the top of the well bore. A seal retainer 21 is threaded on and forms part of the upper housing section 17, carrying a suitable inner seal sleeve 22 for slidably sealing against the periphery of the inner tubular actuator 20 to prevent leakage of fluid between the latter and the housing.

The tubular actuator 20 below the seal sleeve 22 has an externally threaded configuration adapted to coact with internal threads 23 on the housing and body 14 for the purpose of controlling the open and closed conditions of a valve mechanism 24 contained within the tubular actuator 20 and housing 14, which serves the purpose of controlling the flow of fluid between the formation and the tubular string F.

The valve mechanism includes an inner mandrel 25 having a plurality of side ports 26 and releasably secured to the housing or body 14 by a latch mechanism. A latch sleeve 27 is mounted on the lower portion of the mandrel 25 being held thereon by a choke housing 28 threaded on the lower end of the mandrel, the lower portion of the choke housing having a pressure recorder 29, threadedly or otherwise suitably secured thereto, which extends downwardly through the tubular extension 15. The latch sleeve 27 has circumferentially spaced, longitudinally extending latch arms 30 provided with inwardly extending intermediate dogs 31 having beveled upper and lower ends 32 and received within a companion peripheral groove 33 on a holding sleeve 34 which extends upwardly along the arms 30. An upper circumferentially continuous portion 35 of the sleeve 30 receives a plurality of keys 36 movable radially of the latch sleeve. These keys have beveled upper and lower ends 37, being received within an internal groove 38 formed in the housing or body 14. The holding sleeve 34 has an upper groove or recess 39 adapted to be disposed opposite the keys 36 when the sleeve 34 is shifted downwardly along the mandrel 25 and latch sleeve 30 to permit the keys 36 to retract inwardly from the groove 38 and thereby release the mandrel from the housing 14, as described hereinbelow.

Fluid from the formation can flow through the perforations E into the casing B, passing upwardly through the tubular extension 15 and through inlet ports 40 in the lower portion of the choke housing 28 above the pressure recorder 29 to a central passage 41 in the housing. The fluid can then flow upwardly through a choke orifice 42 suitably mounted in the housing and then upwardly through the mandrel passage 43 to the mandrel side ports 26. Above such side ports, the mandrel passage 43 terminates in an end wall 44. Initially, the mandrel side ports 26 are closed by a valve sleeve 45 disposed fully thereacross and releasably secured to the inner tubular actuator 20. As disclosed, the lower portion of the inner tubular actuator 20 has an internal groove 46, the upper and lower sides 47 of which are beveled, in which are received the outer portions of latch dogs 48 slidable radially in the valve sleeve 45, the outward movement of the latch dogs being limited by engagement of dog flanges 49 with the sleeve 45. Inward movement of the latch dogs 48 is initially prevented by their engagement with the periphery of the mandrel 25. However, as described hereinbelow, when the latch dogs are located opposite a peripheral release groove 50 of the mandrel, they can retract inwardly from the lock recess or groove 46 of the inner tubular actuator 20, thereby effecting a release of the valve sleeve 45 from the latter.

The sleeve 45 has suitable side seals 51 mounted thereon initially straddling the side ports 26 to close the same. Above the upper seal 51, the sleeve has an internal circumferential groove 52 communicating with a plurality of outlet ports 53 in the sleeve that open into an annular passage 54 between the upper portion of the valve sleeve 45 and the inner tubular actuator 20. Such annular passage opens upwardly into the central passage 55 through the tubular actuator 20, which communicates freely with the tubular string F extending to the top of the well bore. Above its ports 52, the valve sleeve 45 carries a suitable internal side seal 56 adapted to slidably seal against the periphery of the mandrel or valve stem 25, the seal being held in place by an upper valve sleeve section 57 threaded into the main valve sleeve therebelow, and carrying an upper seal ring 58 slidably sealing against the periphery of the mandrel 25.

The valve 24 is initially in a closed position, as disclosed in FIG. 2a. It is placed in an open condition by shifting the inner tubular member 20 downwardly as a result of its being rotated by the tubular string F to thread it downwardly along the housing or body 14 to align the valve sleeve ports 53 with the mandrel ports 26 (FIG. 3). Continued rotation of the tubular string F and tubular actuator 20 will continue to feed the actuator downwardly within the body or housing 14, carrying the valve sleeve 45 latched to the actuator downwardly with it and along the mandrel 25 to shift the valve sleeve ports 53 out of alignment with and below the mandrel ports 26, placing the valve sleeve seal 56 across these ports 26 to reclose them (FIG. 4). Continued downward shifting of the tubular actuator 20, as a result of its rotation and downward threading within the valve housing and body 14, will cause the lower end of the valve sleeve 45 to engage the retaining sleeve 34, camming the dogs 31 out of the sleeve recess 33 and shifting the sleeve downwardly of the mandrel 25 to a position in which its upper relief groove 39 is opposite the lower keys 36, permitting the latter to retract from the housing groove 38 and detaching the latch sleeve 27 from the housing 14. Such detachment allows the latch sleeve 27 and mandrel 25 to shift upwardly of the housing 14 and the tubular actuator 20 to locate the release groove 50 of the mandrel opposite the upper dogs 48, permitting the latter to retract from the lock groove or recess 46 of the tubular actuator 20 to disconnect the valve sleeve 45 therefrom (FIG. 5). Such action will allow the entire internal mechanism, comprising the pressure recorder 29, choke orifice 42, mandrel 23, latch mechanism disposed thereon, and valve sleeve 45, to move upwardly through the inner tubular actuator 20 and tubular string F to the top of the well bore.

The well production flowing through the perforations E into the casing B might force the internal valve mechanism 24 upwardly through the tubular string F. If such action does not occur, a suitable overshot (not shown) may be lowered on a wire line through the tubular string F, coupling itself in a known manner to a fishing head 60 at the upper end of the mandrel 20, and allowing elevation of the entire internal mechanism through the tubular string F to the top of the well bore.

The threaded interconnection between the inner tubular actuator 20 and the outer housing 14 is such as to positively locate the mandrel ports 26 and the valve sleeve ports 53 in alignment or disalignment with respect to one another, the tubular actuator 20 coming to rest when the ports are in alignment (FIG. 3) and coming to rest again when the ports are out of alignment, or in the closed condition, such as shown in FIG. 4. The operator is given a positive indication at the top of the well bore that the ports 26, 53 are either fully open or are disaligned. If the interval valve mechanism 24 is to be released, as by a continued downward feeding of the tubular actuator 20 within the housing 14, the tubular string F and tubular actuator are rotated to a further extent to cause the lower end of the sleeve 45 to engage the retainer sleeve 34 and shift it downwardly of the mandrel 25 to a latch sleeve key releasing position (FIG. 5).

The actuator and control mechanism includes an internal square thread 23 in the housing or body 14, the uppermost turn of which terminates in a vertical stop shoulder 65. The tubular actuator 20 has externally threaded square sections 66, 67, 68 thereon of the same pitch as the internal thread 23, the lower and upper sections 66, 68 being in phase with one another; whereas, in intermediate section 67 is out of phase with respect to the uppermost and lower section, which, for example, may be about 90 degrees. The lower end of the intermediate external thread 67 terminates in a vertical or longitudinal stop shoulder 69, which is adapted to engage the stop shoulder 65 of the internal thread 23. Similarly, the lowermost end of the upper thread 68 terminates in a longitudinal shoulder 70, which, as described hereinbelow, is adapted to engage the upper end 65 of the internal thread 23.

It is to be noted that the thread space 71 between adjacent turns of the internal thread 23 is substantially greater than the longitudinal thickness of the internal thread 23, which is also true of the space 72, 73 between the lowermost male thread 66 and the intermediate male thread 67. On the other hand, the thread space 74 of the uppermost thread 68 is substantially less than its longitudinal thread thickness. In fact, the thread thickness of the uppermost thread 68 may be substantially the same as the thread space 71 of the internal thread 23, provision being made for working clearance therebetween; whereas, the thread space 74 of the uppermost thread is substantially the same as the thread thickness of the internal thread 23.

The lower, intermediate, and upper sections 66, 67, 68 of the male thread may mesh with the female or internal thread 23 so that rotation of the tubular actuator 20 with respect to the housing 14 will effect a longitudinal feeding of the tubular actuator with respect to the housing. Since the threads disclosed are right-hand, rotation of the tubular actuator 20 to the right will result in its downward feeding within the housing 14 when the male and female threads are appropriately meshed. However, the lower end 69 of the intermediate thread 67 is adapted to engage the stop shoulder 65 at the upper end of the female thread 23, and this is also true of the lower end 70 of the uppermost male thread 68. When the intermediate thread end 69 so engages the stop shoulder 65 provided by the uppermost end of the female thread, further relative rotation between the tubular actuator 20 and the housing or body 14 cannot occur, providing a definite stop or limit to such actuation and threading of the tubular actuator within the housing. However, the coengaging shoulders 69, 65 are adapted to be disengaged so that the threading and feeding of the actuator 20 within the housing 14 can recommence.

Initially, the lowermost thread 66 of the actuator is in mesh with the upper thread turns 23 of the housing 14, the parts being in the position illustrated in FIG. 9 which corresponds to the position shown in FIG. 2a. The bearing of the housing head 18 upon the packer body 13 will preclude downward movement of the housing 14 and will resist and prevent its rotation. Placing of a downward force on the tubular string F and tubular actuator 20 will engage the lower face of the lower male thread 66 with the upper face of the female thread 23, such as shown in FIG. 9. Rotation of the tubular string F and the tubular actuator 20 will now effect a downward feeding of the actuator within the housing 14, until the lower end 69 of the intermediate male thread 67 engages the upper end 65 of the female thread, which will preclude further rotation between the actuator 20 and housing 14. Such engagement will occur since the intermediate thread 67, although of the same pitch as the female thread 23, is 90 degrees out of phase with respect thereto, the parts coming into abutment with one another, such as disclosed most clearly in FIG. 17. As shown in FIG. 10, the vertical end 69 at the lower portion of the intermediate thread 67 is in a position to engage the stop shoulder 65 provided by the upper end of the female thread 23 upon a slight additional degree of turning of the actuator 20. When the thread ends 69, 65 so engage, the actuator 20 will have shifted downwardly within the housing 14 to a predetermined extent, and since the valve sleeve 45 is coupled to the actuator 20 through the latch dogs 48, the valve sleeve will have been shifted downwardly to place its ports 53 in alignment with the mandrel ports 26 (FIG. 3), thereby opening the tester valve 24 and allowing fluid to flow from the formation through the perforations E into the lower housing section 15, then flowing through the inlet ports 40 into the choke housing 28 and up through the orifice 42 and the mandrel passage 43, discharging through the aligned ports 26, 53 into the annular passage 54 around the valve sleeve 45 and then upwardly through the tubular actuator 20 into the tubing string F thereabove.

Figure 11:
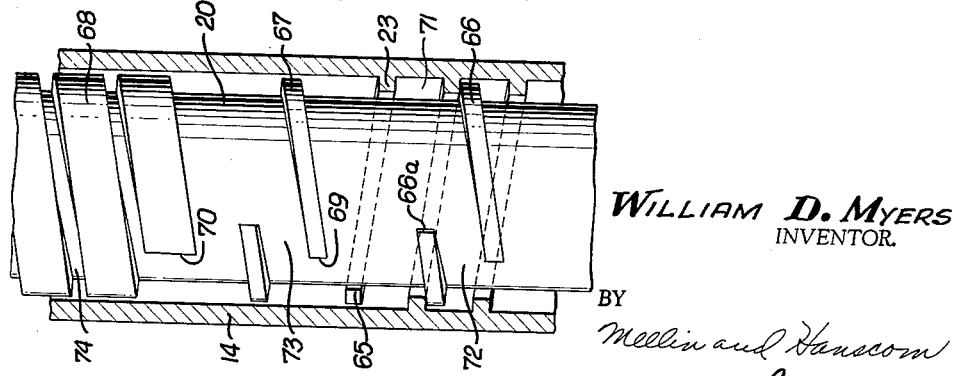
Figure 15:
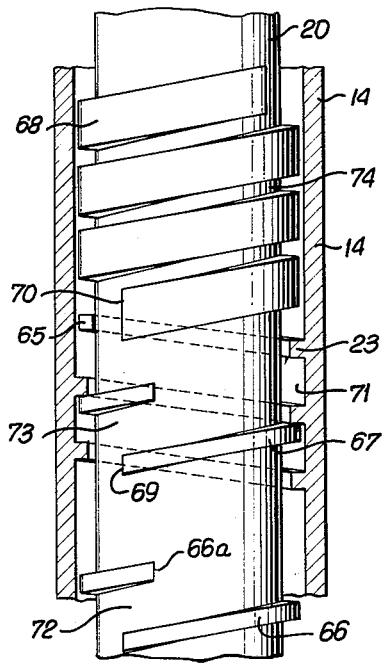
Figure 16:
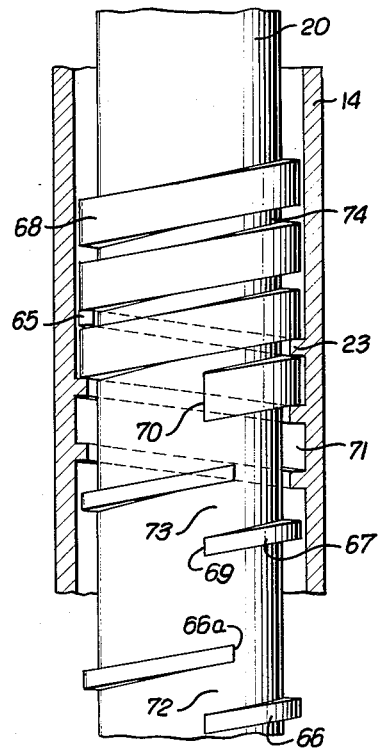

If the valve is to be reclosed, an upward strain or pull is then taken on the tubular string F and actuator 20 connected thereto, until the upper face of the lowermost male thread 66 engages the lower face of the female thread 23, such as disclosed in FIG. 11. Such upward pull, however, will not lift the housing 14 with it, inasmuch as the hydrostatic head of fluid in the casing B above the packer D is greater than the column of fluid that has flowed into the tubing string F, the pressure differential acting on the head 18 and holding it downwardly against the well packer. For purposes of clarity, the tubular actuator and its threads are disclosed in FIG. 11 as having been rotated back about 50 degrees to remove the stop 69 from the female thread stop or shoulder 65. Elevation of the tubular actuator 20 relative to the housing 14 is permitted since the thread space 71 of the female thread is much greater than the thickness of the male thread 66 and results in the lower stop end or shoulder 69 of the intermediate thread 67 being elevated above and disaligned from the stop shoulder 65 of the female thread, as disclosed clearly in FIG. 11.

Figure 14:
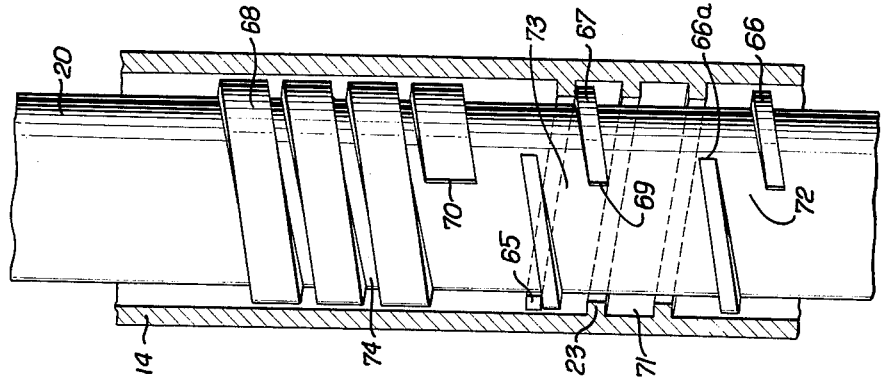
Figure 13:
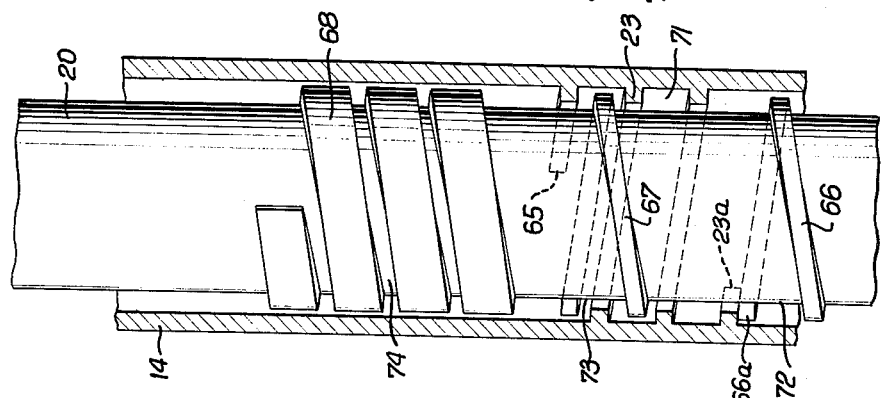
Figure 12:
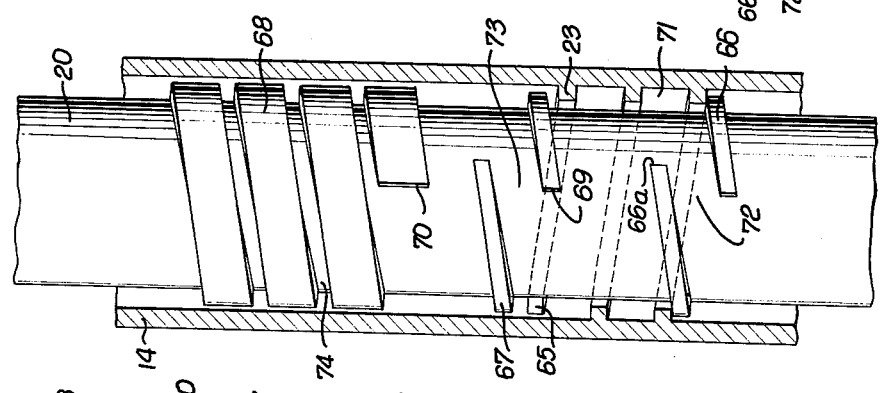

The tubular string F and actuator 20 can now be rotated to the right, the lower male thread 66 engaging the lower face of the female thread 23, the actuator threading downwardly within the housing, as disclosed in FIG. 12, the downward threading action continuing, as disclosed in FIG. 13, until the uppermost end 66a of the lower male thread 66 disengages from the lowermost end 23a of the female thread. Such disengagement allows the tubular actuator 20 to shift upwardly a slight distance to bring the upper face of the intermediate male thread 67 into engagement with the lower surface of the female thread 23, as disclosed most clearly in FIG. 14. Continued right-hand rotation of the tubular string F and the actuator 20 will then thread the latter downwardly within the housing 14 until the lower longitudinal stop end 70 of the upper male thread 68 engages the stop shoulder 65 of the female thread 23, such as disclosed in FIGS. 15 and 18. Such engagement will occur since the upper female thread 68 is out of phase, as, for example, 90 degrees out of phase, with respect to the intermediate male thread 67, but it is in phase with the lower male thread 66.

The engagement of the upper male thread end 70 with the upper end 65 of the female thread again precludes further right-hand rotation of the tubular string F and the actuator 20 within the housing 14, the actuator having shifted downwardly to a further extent and carrying the valve sleeve 45 downwardly with it along the valve mandrel 25 to locate the sleeve ports 53 out of alignment with the mandrel ports 26 and to place the sleeve seal 56 across the mandrel ports 26, thereby closing the latter and precluding any further upward flow of fluid through the valve mechanism into the tubular string F, the valve parts then being in the position illustrated in FIG. 4. The engagement of the lower end 70 of the uppermost male thread 68 with the upper stop end 65 of the female thread 23 positively locates the valve sleeve 45 in a mandrel port closing position, as disclosed in FIG. 4, and apprises the operator of that fact, due to his inability to further rotate the tubular string F and the tubular actuator 20 secured thereto.

By virtue of the closing of the valve, a bottom end shut-in pressure can be obtained and recorded on the pressure recorder 29 in a known manner. If it is then desired to retrieve the tester valve and recorder, the tubular string F is lowered from the position illustrated in FIG. 15 to that shown in FIG. 16, which, for purpose of clarity, shows the tubular actuator and stop shoulder 70 about 90 degrees from the point of engagement with the female stop shoulder 65. Downward movement of the actuator 20 is permitted because of the fact that the thread space 71 between the female thread turns is much greater than the thickness of the intermediate male thread 67, which allows downward movement of the actuator within the housing 14 to the point at which the lower face of the uppermost male thread 68 engages the upper face of the upper turn of the female thread 23, which will place the uppermost male thread 68 in phase with the female thread 23 and disalign its end shoulder 70 from the female thread shoulder 65. The tubular string F and actuator 20 can now be rotated to the right, the male thread 68 threading downwardly through the space 71 of the female thread 23, with the female thread relatively fitting within the companion thread space 74 of the uppermost male thread 68. The tubular actuator 20 feeds downwardly to engage the lower end of the sleeve 45 with the retainer sleeve 34, shifting it downwardly to cam the latch dogs 31 outwardly against the spring force exerted by the inherently retractable arms 30, the sleeve 34 then shifting downwardly to the extent at which an upper sleeve recess 90 is opposite the dogs 31, allowing them to spring inwardly into this recess, at which position the upper relieved portion 39 is opposite the keys 36, permitting their retraction. Since there is normally formation pressure acting upwardly on the mandrel 25, the release of the keys 36 from the groove 38 will allow the mandrel 25 to shift upwardly to place its release groove 50 opposite the upper latch dogs 48, allowing the latter to shift inwardly from the lock recess 46 of the tubular actuator 20, permitting the entire internal valve mechanism 24, including the mandrel 25 and the valve sleeve 45, to move upwardly through the tubing string F for withdrawal at the top of the well bore.

I claim:

1. In apparatus adapted to be operated in a well bore by a running-in string extending to the top of the well bore: inner and outer members, one of said members being adapted for connection to the running-in string; said inner member having external thread means adapted to mesh with internal thread means on said outer member; one of said thread means having a first portion out of phase with a second portion of said one thread means, whereby relative turning in one direction between said members and of said first portion along the other of said thread means brings said second portion into abutting engagement with said other of said thread means to prevent further relative turning between said members in said one direction.

2. In apparatus adapted to be operated in a well bore by a running-in string extending to the top of the well bore: inner and outer members, one of said members being adapted for connection to the running-in string; said inner member having external thread means adapted to mesh with internal thread means on said outer member; one of said thread means having a first portion out of phase with a second portion of said one thread means, whereby relative turning in one direction between said members and of said first portion along the other of said thread means brings said second portion into abutting engagement with said other of said thread means to prevent further relative turning between said members in said one direction; said internal thread means and external thread means having substantial axial play therebetween to allow relative longitudinal shifting between said members to remove said second portion from abutting relation with said other of said thread means and allow relative turning in said one direction between said members with said internal and external thread means in mesh.

3. In apparatus adapted to be operated in a well bore by a running-in string extending to the top of the well bore: inner and outer members, one of said members being adapted for connection to the running-in string; said inner member having external thread means adapted to mesh with internal thread means of said outer member; one of said thread means having a first portion out of phase with a second portion of said one thread means, and an end of said other thread means providing a stop, whereby relative turning in one direction between said members and of said first portion along the other of said thread means brings an end of said second portion into abutment with said stop to prevent further relative turning between said members in said one direction.

4. In apparatus adapted to be operated in a well bore by a running-in string extending to the top of the well bore: inner and outer members, one of said members being adapted for connection to the running-in string; said inner member having external thread means adapted to mesh with internal thread means of said outer member; one of said thread means having a first portion out of phase with a second portion of said one thread means, and an end of said other thread means providing a stop, whereby relative turning in one direction between said members and of said first portion along the other of said thread means brings an end of said second portion into abutment with said stop to prevent further relative turning between said members in said one direction; said internal thread means and external thread means having substantial axial play therebetween to allow relative longitudinal shifting between said members to remove said end of said second portion from abutment with said stop and allow continued relative turning in said one direction between said members with said external and internal thread means in mesh.

5. In apparatus adapted to be operated in a well bore by a running-in string extending to the top of the well bore: inner and outer members, one of said members being adapted for connection to the running-in string; said inner member having external thread means adapted to mesh with internal thread means of said outer member; one of said thread means having a first portion out of phase with a second portion of said one thread means, and a third portion in phase with said first portion, whereby relative turning in one direction between said members and of said first portion along the other of said thread means brings said second portion into abutting engagement with said other of said thread means to prevent further relative turning between said members in said one direction; said internal thread means and external thread means having substantial axial play therebetween to allow relative longitudinal shifting between said members to remove said second portion from abutting relation with said other of said thread means and place said third portion out of phase with said other of said thread means, allowing said second portion to mesh with said other of said thread means and relative turning in said one direction between said members until said third portion abuts said other of said thread means to again prevent relative turning between said members in said one direction.

6. In apparatus adapted to be operated in a well bore by a running-in string extending to the top of the well bore: inner and outer members, one of said members being adapted for connection to the running-in string; said inner member having external thread means adapted to mesh with internal thread means of said outer member; one of said thread means having a first portion out of phase with a second portion of said one thread means and a third portion in phase with said first portion; an end of said other thread means providing a stop, whereby relative turning in one direction between said members and of said first portion along the other of said thread means brings an end of said second portion into abutment with said stop to prevent further relative turning between said members in said one direction; said internal thread means and external thread means having substantial axial play therebetween to allow relative longitudinal shifting between said members to remove said end of said second portion from abutment with said stop and place said third portion out of phase with said other of said thread means, allowing said second portion to mesh with said other of said thread means and relative turning in said one direction between said members until an end of said third portion abuts said stop to prevent further relative turning between said members in said one direction.

7. In apparatus adapted to be operated in a well bore by a running-in string extending to the top of the well bore: inner and outer members, one of said members being adapted for connection to the running-in string; said inner member having external thread means adapted to mesh with internal thread means of said outer member; one of said thread means having a first portion out of phase with a second portion of said one thread means, and a third portion in phase with said first portion, whereby relative turning in one direction between said members and of said first portion along the other of said thread means brings said second portion into abutting engagement with said other of said thread means to prevent further relative turning between said members in said one direction; said internal thread means and external thread means having substantial axial play therebetween to allow relative longitudinal shifting between said members to remove said second portion from abutting relation with said other of said thread means and place said third portion out of phase with said other of said thread means, allowing said second portion to mesh with said other of said thread meas and relative turning in said one direction between said members until said third portion abuts said other of said thread means to again prevent relative turning between said members in said one direction; said members being longitudinally shiftable with respect to one another to shift said third portion from abutment with said other of said thread means and into a position to mesh therewith, whereby relative turning between said members in said one direction can continue.

8. In apparatus adapted to be operated in a well bore by a running-in string extending to the top of the well bore: inner and outer members, one of said members being adapted for connection to the running-in string; said inner member having external thread means adapted to mesh with internal thread means of said outer member; one of said thread means having a first portion out of phase with a second portion of said one thread means and a third portion in phase with said first portion; an end of said other thread means providing a stop, whereby relative turning in one direction between said members and of said first portion along the other of said thread means brings an end of said second portion into abutment with said stop to prevent further relative turning between said members in said one direction; said internal thread means and external thread means having substantial axial play therebetween to allow relative longitudinal shifting between said members to remove said end of said second portion from abutment with said stop and place said third portion out of phase with said other of said thread means, allowing said second portion to mesh with said other of said thread means and relative turning in said one direction between said members until an end of said third portion abuts said stop to prevent further relative turning between said members in said one direction; said members being longitudinally shiftable with respect to one another to shift said third portion from abutment with said stop and into a position to mesh with said other of said thread means, whereby relative turning between said members in said one direction can continue with said third portion in mesh with said other thread means.

9. In apparatus adapted to be operated in a well bore by a running-in string extending to the top of the well bore; inner and outer members, one of said members being adapted for connection to the running-in string; said inner member having external thread means adapted to mesh with internal thread means of said outer member; said external thread means having a first portion out of phase with a second portion of said external thread means, whereby relative turning in one direction between said members and of said first portion along said internal thread means brings said second portion into abutting engagement with said internal thread means to prevent further relative turning between said members in said one direction.

10. In apparatus adapted to be operated in a well bore by a running-in string extending to the top of the well bore: inner and outer members, one of said members being adapted for connection to the running-in string; said inner member having external thread means adapted to mesh with internal thread means of said outer member; said external thread means having a first portion out of phase with a second portion of said external thread means, whereby relative turning in one direction between said members and of said first portion along said internal thread means brings said second portion into abutting engagement with said internal thread means to prevent further relative turning between said members in said one direction; said internal thread means and external thread means having substantial axial play therebetween to allow relative longitudinal shifting between said members to remove said second portion from abutting relation with said internal thread means and then allow relative turning in said one direction between said members with said internal and external thread means in mesh.

11. In apparatus adapted to be operated in a well bore by a running-in string extending to the top of the well bore: inner and outer members, one of said members being adapted for connection to the running-in string; said inner member having external thread means adapted to mesh with internal thread means of said outer member; said external thread means having a first portion out of phase with a second portion of said external thread means, and an end of said internal thread means providing a stop, whereby relative turning in one direction between said members and of said first portion along said internal thread means brings an end of said second portion into abutment with said stop to prevent further relative turning between said members in said one direction.

12. In apparatus adapted to be operated in a well bore by a running-in string extending to the top of the well bore: inner and outer members, one of said members being adapted for connection to the running-in string; said inner member having external thread means adapted to mesh with internal thread means of said outer member; said external thread means having a first portion out of phase with a second portion of said external thread means, and an end of said internal thread means providing a stop, whereby relative turning in one direction between said members and of said first portion along said internal thread means brings an end of said second portion into abutment with said stop to prevent further relative turning between said members in said one direction; said internal thread means and external thread means having substantial axial play therebetween to allow relative longitudinal shifting between said members to remove said end of said second portion from abutment with said stop and allow continued relative turning in said one direction between said members with said external and internal thread means in mesh.

13. In apparatus adapted to be operated in a well bore by a running-in string extending to the top of the well bore: inner and outer members, one of said members being adapted for connection to a running-in string; said inner member having external thread means adapted to mesh with internal thread means of said outer member; said external thread means having a first portion out of phase with a second portion of said external thread means, and a third portion in phase with said first portion, whereby relative turning in one direction between said members and of said first portion along said internal thread means brings said second portion into abutting engagement with said internal thread means to prevent further relative turning between said members in said one direction; said internal thread means and external thread means having substantial axial play therebetween to allow relative longitudinal shifting between said members to remove said second portion from abutting relation with said internal thread means and place said third portion out of phase with said internal thread means, allowing meshing of said second portion with said internal thread means and relative turning in said one direction between said members until said third portion abuts said internal thread means to again prevent relative turning between said members in said one direction.

14. In apparatus adapted to be operated in a well bore by a running-in string extending to the top of the well bore: inner and outer members, one of said members being adapted for connection to the running-in string; said inner member having external thread means adapted to mesh with internal thread means of said outer member; said external thread means having a first portion out of phase with a second portion of said external thread means, and a third portion in phase with said first portion; said internal thread means having an end providing a stop, whereby relative turning in one direction between said members and of said first portion along said internal threads means brings an end of said second portion into abutment with said stop to prevent further relative turning between said members in said one direction; said internal thread means having substantial axial play therebetween to allow relative longitudinal shifting between said members to remove said second portion from said stop and place said third portion out of phase with said internal thread means, allowing said second portion to mesh with said internal thread means and relative turning in said one direction between said members until said third portion abuts said stop to again prevent relative turning between said members in said one direction.

15. In apparatus adapted to be operated in a well bore by a running-in string extending to the top of the well bore: inner and outer members, one of said members being adapted for connection to a running-in string; said inner member having external thread means adapted to mesh with internal thread means of said outer member; said external thread means having a first portion out of phase with a second portion of said external thread means, and a third portion in phase with said first portion, whereby relative turning in one direction between said members and of said first portion along said internal thread means brings said second portion into abutting engagement with said internal thread means to prevent further relative turning between said members in said one direction; said internal thread means and external thread means having substantial axial play therebetween to allow relative longitudinal shifting between said members to remove said second portion from abutting relation with said internal thread means and place said third portion out of phase with said internal thread means, allowing meshing of said second portion with said internal thread means and relative turning in said one direction between said members until said third portion abuts said internal thread means to again prevent relative turning between said members in said one direction; said members being longitudinally shiftable with respect to one another to shift said third portion from abutment with said internal thread means and into a position to mesh therewith, whereby relative turning between said members in said one direction can continue.

16. In apparatus adapted to be operated in a well bore by a running-in string extending to the top of the well bore: inner and outer members, one of said members being adapted for connection to the running-in string; said inner member having external thread means adapted to mesh with internal thread means of said outer member; said external thread means having a first portion out of phase with a second portion of said external thread means, and a third portion in phase with said first portion; said internal thread means having an end providing a stop, whereby relative turning in one direction between said members and of said first portion along said internal thread means brings an end of said second portion into abutment with said stop to prevent further relative turning between said members in said one direction; said internal thread means having substantial axial play therebetween to allow relative longitudinal shifting between said members to remove said second portion from said stop and place said third portion out of phase with said internal thread means, allowing said second portion to mesh with said internal thread means and relative turning in said one direction between said members until said third portion abuts said stop to again prevent relative turning between said members in said one direction; said members being longitudinally shiftable with respect to one another to shift said third portion from abutment with said stop and into a position to mesh with said internal thread means, whereby relative turning between said members in said one direction can continue.

References Cited by the Examiner
UNITED STATES PATENTS

| | | | |
|---|---|---|---|
| 301,367 | 8/1884 | Hoag | 251—265 X |
| 2,878,878 | 3/1959 | Baker | 166—237 |
| 2,951,539 | 9/1960 | Malone et al. | 166—237 |
| 3,002,566 | 10/1961 | Bostock | 166—224 |
| 3,036,810 | 5/1962 | Conrad et al. | 251—264 X |
| 3,050,132 | 8/1962 | Page | 166—224 |

CHARLES E. O'CONNELL, *Primary Examiner.*

BENJAMIN HERSH, *Examiner.*